United States Patent [19]
Roberts

[11] Patent Number: 5,358,262
[45] Date of Patent: Oct. 25, 1994

[54] MULTI-LAYER SEAL MEMBER

[75] Inventor: Martyn G. Roberts, Roswell, Ga.

[73] Assignee: Rolls-Royce, Inc., Reston, Va.

[21] Appl. No.: 958,677

[22] Filed: Oct. 9, 1992

[51] Int. Cl.$^5$ .................................................. F16J 15/00
[52] U.S. Cl. .................................... 277/230; 277/26; 277/227; 87/8
[58] Field of Search ............ 277/26, 178, 189.5, 277/227, 229, 230; 87/6, 7, 8, 9

[56] References Cited

U.S. PATENT DOCUMENTS

| | | | |
|---|---|---|---|
| 3,284,163 | 11/1966 | Dear | 277/230 |
| 3,836,159 | 9/1974 | Dryer | 277/180 |
| 4,441,726 | 4/1984 | Uhl | 277/230 |
| 4,576,081 | 3/1986 | Fellhuis | 87/8 |
| 4,657,795 | 4/1987 | Foret | 87/9 |
| 5,082,293 | 1/1992 | Steinetz et al. | |
| 5,165,323 | 11/1992 | Sato | 92/92 |
| 5,253,318 | 10/1993 | Sayegh et al. | 385/114 |

FOREIGN PATENT DOCUMENTS 0142239 11/1930 Fed. Rep. of Germany ........... 87/6

OTHER PUBLICATIONS

NASA Tech Brief, Fall 1979, p. 430 Flexible Heat and Pressure Seal (Author Unknown).

*Primary Examiner*—William A. Cuchlinski, Jr.
*Assistant Examiner*—Daniel G. DePumpo
*Attorney, Agent, or Firm*—Oliff & Berridge

[57] ABSTRACT

A seal for use at high temperatures in an interface between a ceramic component and a metal component has a multi-layer construction arranged so that the seal expands disproportionately more in cross-section than in elongation at increasing operating temperatures. The seal comprises a central core made up of a bundle of elongate ceramic fibers surrounded by a layer of braided metal wire and an outer sheath of braided ceramic fiber. The seal may be formed as an O-ring.

11 Claims, 2 Drawing Sheets

MULTI-LAYER SEAL MEMBER

BACKGROUND TO INVENTION

This invention relates to a multi-layer seal member for use in sealing joints between components which are subject to high temperature. In particular it finds application where the components are of dissimilar materials such as ceramics or ceramic composites and metals.

Ceramics and ceramic composite materials are often employed for the manufacture of components which are subject to high temperatures. When such components have to be joined to other components made of metal, for example in the exhaust ducting of a gas turbine engine, sealing between the components is a problem. Over a wide temperature range differential expansion and contraction characteristics of the different materials reduces seal efficiency due to relative movement of the components. For instance, in the example mentioned, seals have to be capable of operating satisfactorily at temperatures in excess of 1000° C. to prevent the leakage of exhaust gas from the ducting.

Known sealing mediums in present use include ceramic fibers compressed into annular rings, or O-rings, of circular cross-section and impregnated with a binding agent. These known sealing means suffer from certain disadvantages such as, for example, the inability to respond quickly to the dimensional changes which take place as the components of a joint react to temperature change. The selection of a seal member especially with reference to its thermal conductivity is thus particularly important since it determines the maximum operating temperature of a sealed joint.

The invention has for an objective to provide an improved seal member for abutting components subject to temperature change.

Another objective of the invention is to provide an improved seal member such as an O-ring for sealing abutting surfaces of dissimilar materials such as ceramic and metal subject to relative movement due to differential thermal expansion. The surfaces may be planar surfaces, for example, end flanges or the surfaces of telescopically arranged cylindrical members.

A further objective of the invention is to provide an improved seal member such as an O-ring which tightens as temperature increases.

These and further objectives will be apparent from the following description.

SUMMARY OF THE INVENTION

According to the invention there is provided a multi-layer seal member comprising a core of elongate fibers extending along an axis, an intermediate layer of braided metal wires having a first braid angle relative to said axis, and an outer sheath of ceramic fibers having a second braid angle relative to said axis.

Preferably the second braid angle is less than the first braid angle and the first braid angle is less than 15°.

DETAILED DESCRIPTION OF A PREFERRED EMBODIMENT

The invention seeks to provide an improved seal member for such as an O-ring which does not have the disadvantages of known sealing devices, and an embodiment of the invention will now be described with reference to the drawings.

Figure 1:
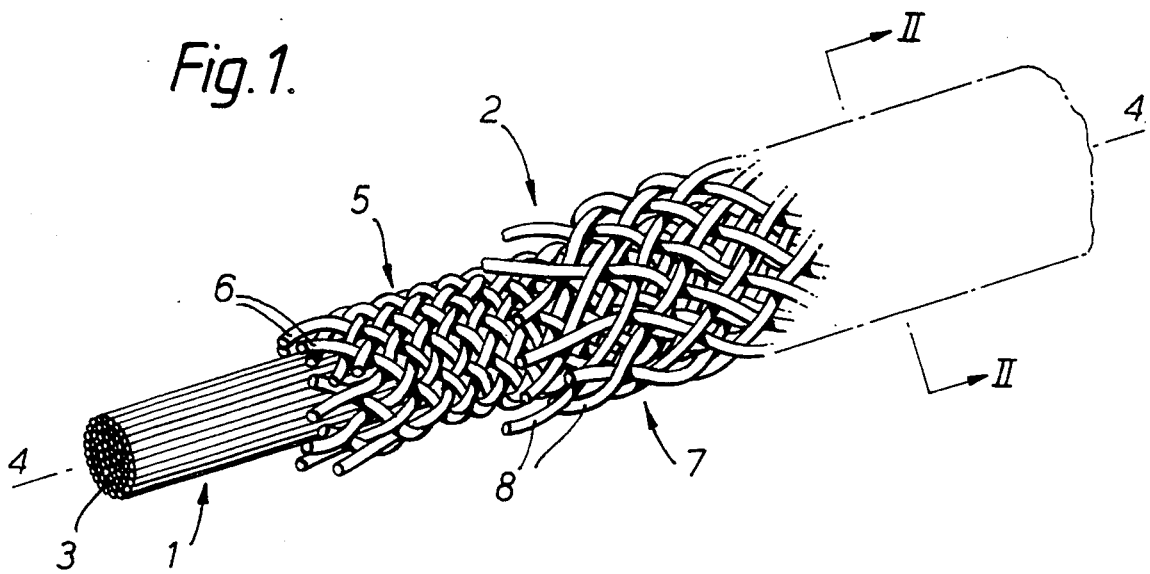
FIG. 1 is a partly cutaway view of a portion of an improved seal member according to the invention.
Figure 2:
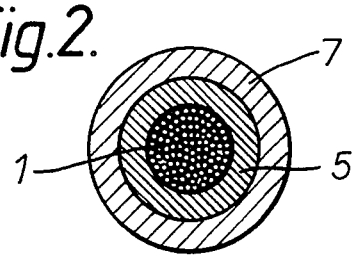
FIG. 2 is a cross-section along the line II—II in FIG. 1.

FIG. 1 shows in perspective a length of seal member having a multi-layer construction in accordance with the invention, the view is partly cutaway to reveal details of the construction. FIG. 2 shows a transverse section through the seal member illustrating the concentricity of the constituent layers.

Figure 3:
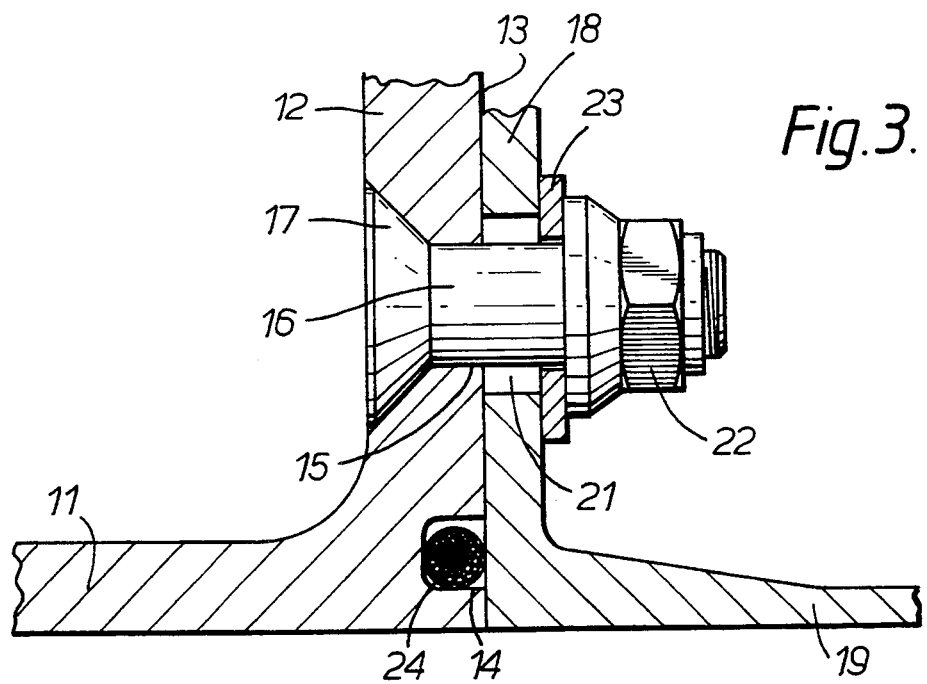
FIG. 3 is a cross-section through a typical joint between abutting flanges of an exhaust gas duct.
Figure 4:
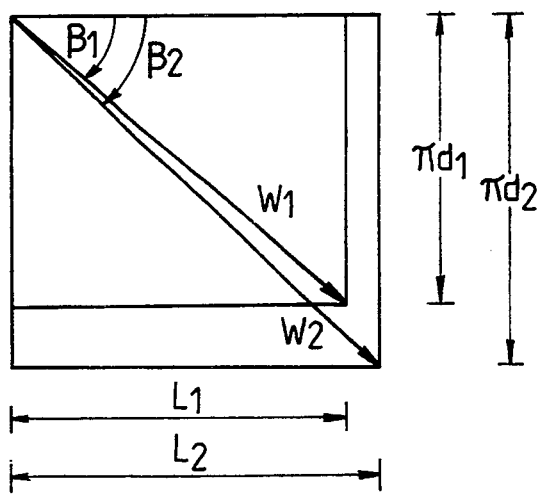
FIG. 4 is a vector diagram illustrating the effect of thermal expansion of the braided metal layer in seal member diameter.

The seal member may be made up as an endless length or loop to serve as an O-ring seal as indicated in the embodiment illustrated in FIG. 3. It is to be understood, however, that the invention is not concerned exclusively with O-ring seal construction, nor exclusively with duct seals.

Referring to FIGS. 1 and 2 the central core 1 of a length of seal member 2 is composed of a bundle of ceramic fibers 3 extending parallel with axis 4. In O-ring construction this core 1 is, of course, annular in form, i.e. the fibers 3 and the axis form a closed loop. In general the fibers 3 are axially extending.

Overlaying the ceramic fibers 3 of core 1 is a first layer or sheath 5 of braided metal wire 6. In turn sheath 5 is over-laid by a second sheath 7 of braided ceramic fibers 8. The preferred ceramic material is alumino silicate or mullite but other materials may also be used.

The braid angles relative to axis 4 at which the braided metal wires 6 forming the intermediate layer of sheath 5 are laid and of the braided ceramic fibers 8 of the outer sheath 7 have a considerable influence in operation on the thermal behaviour of the seal member 2. Preferably the braid angle of the ceramic fibers 8 of the outer sheath 7 relative to the axis 4 is less than the braid angle of the metal wires 6 of the inner sheath 5 relative to that axis.

The construction of FIGS. 1 and 2 is arranged so that the cross-section area of the seal swells disproportionately as the temperature increases. The thermal response of, in combination, a central core of axial ceramic fibers surrounded by braided metallic wire and an outer sheath of braided ceramic fibers ensures this. The braided ceramic fibers and wire may be in layers but the ceramic fibers must be braided at a lower braid angle, relative to the axis, than the metal fibers to ensure that diametral expansion is determined by the metal.

In the particular case of an O-ring seal construction the ceramic fiber core controls thermal expansion of the seal circumference. Thus, as temperature increases the seal tends to maintain its fit in a seat in a ceramic member but the greater expansion of the metal wire tends to increase the cross-section diameter. The effect can be demonstrated mathematically, with reference to FIG. 5, by considering the changes which take place in a unit length of seal.

Let
L=length of a unit cell
W=length of a braid strand within the unit cell
$\beta$=braid angle of strand relative to axis
$\alpha_m$=coefficient of thermal expansion—for metal
$\alpha_c$=coefficient of thermal expansion—for ceramic
T=temperature of seal
d=diameter of seal.

The value of quantities at a lower "cold" temperature are denoted by suffix "1" and the value of the same quantities at a higher "hot" temperature are denoted by the suffix "2".

Figure 5:
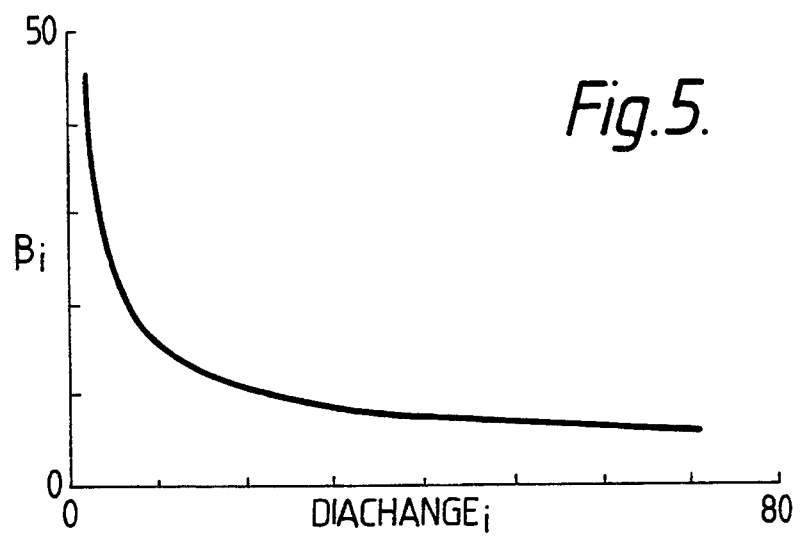
FIG. 5 is a graph illustrating the relationship between braid angle and the diameter of the seal member upon heating.

FIG. 5 illustrates a unit cell of seal member the length of which is L, this is the axial length of seal taken by one wire strand to complete one full revolution of the seal. The circumference of the seal is therefore $\pi$ d. If the cell is represented in geometrically developed form as a rectangle than: the length of the wire strand W is equal to the length of a diagonal and the braid angle is given by $\beta$.

Therefore the following relationships hold:

$$L_2 = L_1(1 + \alpha_c T)$$

$$W_2 = W_1(1 + \alpha_m T)$$

$$w_1 = \pi d_1 / \sin \beta_1 \text{ and}$$

$$L_1 = \pi d_1 / \tan \beta_1$$

Using equation $$L_2^2 + (\pi d_2)^2 = W_2^2$$

Substituting for $L_2$ and $W_2$ and $L_1$ and $W_1$ gives $$\left( \frac{\pi d_1}{\tan \beta_1} \right)^2 (1 + \alpha_c T)^2 + (\pi d_2)^2 = \left( \frac{\pi d_1}{\sin \beta_1} \right)^2 (1 + \alpha_m T)^2$$

Dividing by $\pi d_1$ gives:

$$\frac{d_2}{d_1} = \sqrt{ \left[ \left( \frac{1 + \alpha_m T}{\sin \beta_1} \right) \right]^2 - \left[ \left( \frac{1 + \alpha_c T}{\tan \beta_1} \right) \right]^2 }$$

Using typical values for:

| | |
|---|---|
| coefficient of expansion of metal wire | $\alpha_m = 16 \times 10^{-6}$ |
| coefficient of expansion for ceramic | $\alpha_c = 7 \times 10^{-6}$ |
| temperature increase | T = 800° C. |

Using these values in the above expression the graph of FIG. 5 can be constructed showing the relationship between diameter change and braid angle for a range of braid angles when subject to a temperature increase of 800° C.

Figure 6:
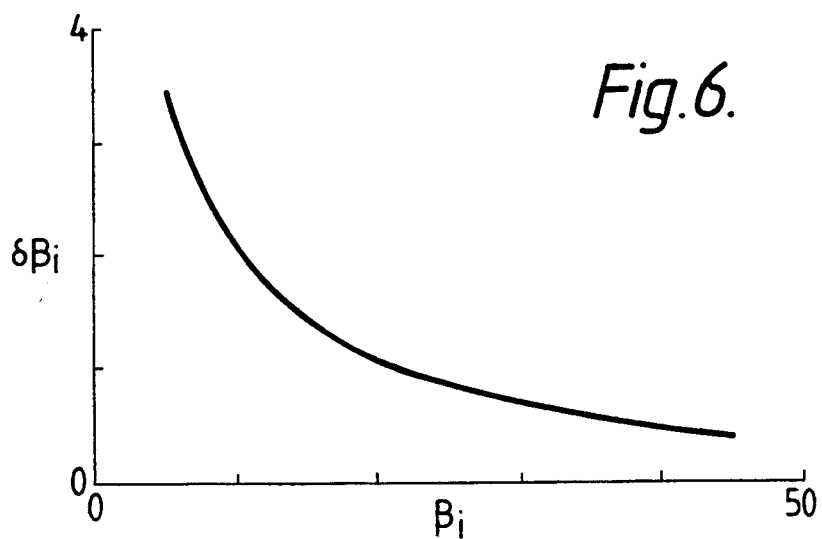
FIG. 6 is a graph plotting the relationship between the change of braid angle and the braid angle in the seal member.

Furthermore, it can be shown that the change of braid angle is related to braid angle, and this is also illustrated graphically in FIG. 6.

It will be understood from the above that the effect of heat upon a seal according to the invention results in an effect where changing the braid angle results in a change in diameter. FIG. 5 shows the change in diameter of a nickel alloy wire fiber seal at 800° C. for different braid angles. It will be realised that the braid angle is the angle the fibers or metal wires make on either side of the axis of the seal. As can be seen, for a significant increase in diameter (say 10%) a braid angle of less than 15° is required.

FIG. 3 shows an O-ring seal constructed in accordance with the principles illustrated in FIGS. 1 and 2 and as described above with reference to the remaining figures of the drawings. The drawing of FIG. 3 shows one end of a cylindrical duct wall 11 constructed in ceramic material. It is formed with an outwardly turned flange 12 to which a corresponding end flange 18 of a metal duct 19 is bolted.

The two flanges 12,18 are secured together by a ring of bolts 16 spaced apart around the assembly. Each bolt 16 has a countersunk head 17 which engages a countersunk bore in the exposed surface of the flange 12 of the ceramic section. In the opposite metal flange 18 there is a receiving bore 21 which is formed radially slotted to accommodate the greater differential expansion of the metal component relative to the ceramic component. Bolt 16 is secured by a nut 22 which traps a washer 23.

A gas tight seal is provided by means of an O-ring seal 24 trapped between the component flanges. The joint face of ceramic flange 13 is formed with an annular recess 14. The O-ring seal 24 has a cross-section diameter slightly greater than the depth of recess 14. Thus, when the joint is assembled and secured the O-ring is slightly pinched. The recess, however, is wider than its depth thereby leaving room for the O-ring 24 to expand sideways i.e. in the radial direction of the flange faces. Preferably the overall diameter of the O-ring 24 is chosen so that the seal, at ambient temperature, touches the radially inner face of the annular groove 14.

The sealing medium described with reference to FIGS. 1, 2 and 3 enables an increase in cross-sectional area to be achieved upon heating, the fiber core controlling the thermal expansion circumferentially so, as temperature increases, the seal tends to maintain its fit in the seating diameter of the ceramic member 12, but the greater expansion of the metal wire sheath tends to increase the cross-sectional diameter.

I claim:

1. A multi-layer seal member comprising:

a core of elongate fibers disposed in an axial direction of the core, said fibers having a first coefficient of thermal expansion, a plurality of cylindrical layers arranged concentrically around said core and including, a first layer of braided metal wires forming a closely fitted cylinder surrounding said core, said braided metal wire being a mesh of multiple wires woven crosswise at a first braid angle relative to the axis of said core, said braided metal wires having a second coefficient of thermal expansion substantially greater than said first coefficient of thermal expansion, a second layer of braided ceramic fibers forming a closely fitted cylinder surrounding said first layer, said braided ceramic fibers of said second layer being a mesh of multiple fibers woven crosswise at a second braid angle relative to the axis of said core, said braided ceramic fibers having a third coefficient of thermal expansion which is substantially equal to said first coefficient of thermal expansion, said second braid angle being smaller than said first braid angle such that diametral thermal expansion of the seal is determined by said first layer.

2. A multi-layer seal member according to claim 1 wherein said core comprises elongate ceramic fibers.

3. A multi-layer seal member according to claim 1 wherein said first braid angle is no greater than approximately 15°.

4. A multi-layer seal member according to claim 2 wherein said ceramic fibers of said core and said second layer comprise a material selected from the group of alumino silicate and mullite fiber.

5. A multi-layer seal member according to claim 1 wherein said braided metal wires of said second layer comprise a material from the group of nickel and nickel alloy.

6. A multi-layer seal member according to claim 1 wherein the axis of said core forms an annulus.

7. A multi-layer seal member according to claim 1 wherein said multi-layer seal member forms an O-ring.

8. A multi-layer seal member according to claim 1 formed into a continuous length having two ends.

9. A joint between a ceramic and a metal article comprising a first end face of a ceramic article, a second end face of an abutting metal article, and a groove formed in one of said first end face of the ceramic article and said second end face of the metal article, a multi-layer seal member having a substantially uniform diameter inserted in said groove, said seal member comprising a core of elongate ceramic fibers disposed in an axial direction of the core, said ceramic fibers possessing a first coefficient of thermal expansion, a plurality of layers arranged in tight fitting concentric cylinders surrounding said core and including a first layer of braided metal wires forming a cylinder closely fitted around said core, said braided wires being a mesh of multiple wires woven crosswise at a first braid angle relative to the axis of said core, said metal wires having a second coefficient of thermal expansion substantially greater than said first coefficient of thermal expansion, a second layer of braided ceramic fibers forming a cylinder closely fitted around said first layer, said braided ceramic fibers of said second layer being a mesh of multiple fibers woven crosswise at a second braid angle relative to the axis of said core, said braided ceramic fibers having a third coefficient of thermal expansion substantially equal to said first coefficient of thermal expansion, said second braid angle of said second layer being smaller than said first braid angle of said first layer so that diametral thermal expansion of said multi-layer seal member is determined by said first layer, said groove having a depth which is smaller than the diameter of said multi-layer seal member and a width greater than the diameter of said multi-layer seal member.

10. A joint according to claim 9 wherein said groove is formed in said first end face of the ceramic article.

11. A joint between a ceramic and metal article according to claim 9 wherein said groove forms an annulus, and said multi-layer seal forms an o-ring which is dimensioned to fit in said groove.

* * * * *